United States Patent
Kuroda

(10) Patent No.: US 8,964,151 B2
(45) Date of Patent: Feb. 24, 2015

(54) ACTIVE MATRIX SUBSTRATE, DISPLAY PANEL, DISPLAY DEVICE, AND TELEVISION RECEPTION DEVICE

(75) Inventor: Tatsuro Kuroda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 13 days.

(21) Appl. No.: 13/983,516

(22) PCT Filed: Feb. 9, 2012

(86) PCT No.: PCT/JP2012/052958
§ 371 (c)(1),
(2), (4) Date: Aug. 2, 2013

(87) PCT Pub. No.: WO2012/111524
PCT Pub. Date: Aug. 23, 2012

(65) Prior Publication Data
US 2013/0314616 A1  Nov. 28, 2013

(30) Foreign Application Priority Data
Feb. 16, 2011 (JP) ................................. 2011-031222

(51) Int. Cl.
*G02F 1/136* (2006.01)
*G02F 1/1362* (2006.01)
*G02F 1/1343* (2006.01)

(52) U.S. Cl.
CPC .... *G02F 1/136286* (2013.01); *G02F 1/134336* (2013.01); *G02F 2201/50* (2013.01)
USPC ................................ 349/138; 349/38; 349/39

(58) Field of Classification Search
USPC .............................................. 349/38–39, 138
See application file for complete search history.

(56) References Cited

U.S. PATENT DOCUMENTS 6,232,620 B1   5/2001   Katoh

FOREIGN PATENT DOCUMENTS

JP   H11-142879 A   5/1999

OTHER PUBLICATIONS

U.S. Appl. No. 13/983,519, filed Aug. 2, 2013.

*Primary Examiner* — Phu Vu
(74) *Attorney, Agent, or Firm* — Chen Yoshimura LLP

(57) ABSTRACT

The substrate 20 of the present invention includes pixel electrodes 25 formed in an area demarcated by a plurality of gate wiring lines 26 and source wiring lines 27 that intersect each other, and capacitance wiring lines 126 that are arranged in parallel with the gate wiring lines 26 and that form a capacitance with the pixel electrodes 25. The capacitance wiring lines 126 are arranged overlapping outer edges 125 and 125 of the adjacent pixel electrodes 25 and 25, and the following are formed on the capacitance wiring line 126: a first insulating film that covers the capacitance wiring line 126; a linear height-increasing part 30 formed on the first insulating film; and a second insulating film that covers the height-increasing part 30 and that includes a protruding band part 129 rising along the height-increasing part 30. The pixel electrodes 25 are above the second insulating film and are formed so the outer edges 125 ride up on the protruding band part 129.

9 Claims, 18 Drawing Sheets

ACTIVE MATRIX SUBSTRATE, DISPLAY PANEL, DISPLAY DEVICE, AND TELEVISION RECEPTION DEVICE

TECHNICAL FIELD

The present invention relates to an active matrix substrate, a display panel, a display device, and a television receiver.

BACKGROUND ART

Liquid crystal panels (a type of display panel) used for liquid crystal display devices include a pair of substrates arranged so as to face each other, and a liquid crystal layer and the like interposed between these substrates. One of these substrates is an active matrix substrate with a plurality of thin-film transistors and pixel electrodes arranged in a matrix on the surface thereof.

The thin-film transistors and pixel electrodes on the active matrix substrate are assigned so as to correspond to respective pixels of the liquid crystal panel. The thin-film transistor and pixel electrode in each pixel is demarcated by a plurality of gate wiring lines, source wiring lines, and the like arranged on the active matrix substrate so as to intersect each other.

When the active matrix substrate is viewed in a plan view, a portion of the pixel electrode appears to overlap a portion of the gate wiring line (or the capacitance wiring line) via an insulating film (an interlayer insulating film) or the like. By arranging a portion of the pixel electrode as such, a capacitance is formed between the pixel electrode and the gate wiring line (see Patent Document 1, for example). It is preferable for the pixel electrode to overlap the gate wiring line as much as possible from the viewpoint of securing the capacitance of each pixel.

RELATED ART DOCUMENT

Patent Document

Patent Document 1: Japanese Patent Application Laid-Open Publication No. H11-142879

Problems to be Solved by the Invention

However, if the outer edges of each pixel electrode on the active matrix substrate are made to overlap the gate wiring line as much as possible, then the pixel electrodes, which are adjacent to each other across the gate wiring line, become too close to each other, and there is the risk of so-called leakage occurring due to the pixel electrodes electrically connecting to each other. If a leakage occurs, those pixels will suffer from two consecutive display anomalies (bright spots, for example).

SUMMARY OF THE INVENTION

The present invention aims at providing: an active matrix substrate, where it is possible to set a narrow distance between pixel electrodes adjacent to each other across a capacitance wiring line; a display panel provided with the substrate; a display device provided with the display panel, and a television receiver provided with the display device.

Means for Solving the Problems

An active matrix substrate according to the present invention is constituted by an active matrix substrate including pixel electrodes formed in respective areas demarcated by a plurality of gate wiring lines and source wiring lines that intersect each other, and capacitance wiring lines that are arranged in parallel with the gate wiring lines, the capacitance wiring lines respectively forming capacitances with the pixel electrodes, wherein the capacitance wiring lines are arranged overlapping outer edges of the pixel electrodes adjacent to each other, wherein each of the capacitance wiring lines has formed thereon: a first insulating film that covers the capacitance wiring line; a height-increasing part in a linear shape formed on the first insulating film and having a narrower line width than the capacitance wiring line, the height-increasing part being formed along the capacitance wiring line; and a second insulating film covering the height-increasing part, the second insulating film being provided with a protruding band part rising along the height-increasing part, and wherein the pixel electrodes are formed on the second insulating film such that the outer edges of the pixel electrodes adjacent to each other respectively ride up on the protruding band part.

The active matrix substrate may be configured such that the height-increasing part includes two end parts and a middle part interposed therebetween, and a height of the end parts may be set lower than a height of the middle part.

The active matrix substrate may be configured such that the height-increasing part includes two end parts and a middle part interposed therebetween, and a line width of the end parts may be set narrower than a line width of the middle part.

In the active matrix substrate, it is preferable for the height-increasing part to be made of a semiconductor film.

In the active matrix substrate, it is preferable for the height-increasing part to include a lower layer part that is made of a semiconductor film, and an upper layer part formed thereon and made of the same material as the source wiring lines.

In the active matrix substrate, it is preferable for end parts of the pixel electrodes to have a belt shape that extends along each of the capacitance wiring lines, and to have cut-out parts at both ends on an edge of the belt shape.

A display panel according to the present invention is provided with the active matrix substrate.

A display device according to the present invention is provided with an illumination device, and the display panel that uses light from the illumination device to perform a display.

A television receiver according to the present invention is provided with the display device.

Effects of the Invention

According to the present invention, it is possible to provide: an active matrix substrate, where it is possible to set a narrow distance between pixel electrodes adjacent to each other across a capacitance wiring line; a display panel provided with the substrate; a display device provided with the display panel, and a television receiver provided with the display device.

DETAILED DESCRIPTION OF EMBODIMENTS

Embodiment 1

Embodiment 1 of the present invention will be explained with reference to FIGS. 1 to 13. In the present embodiment, an active matrix substrate in a liquid crystal panel used in a liquid crystal display device 10 is shown by example. The upper side of FIG. 2 is the front side, and the lower side is the rear side.

Figure 1:
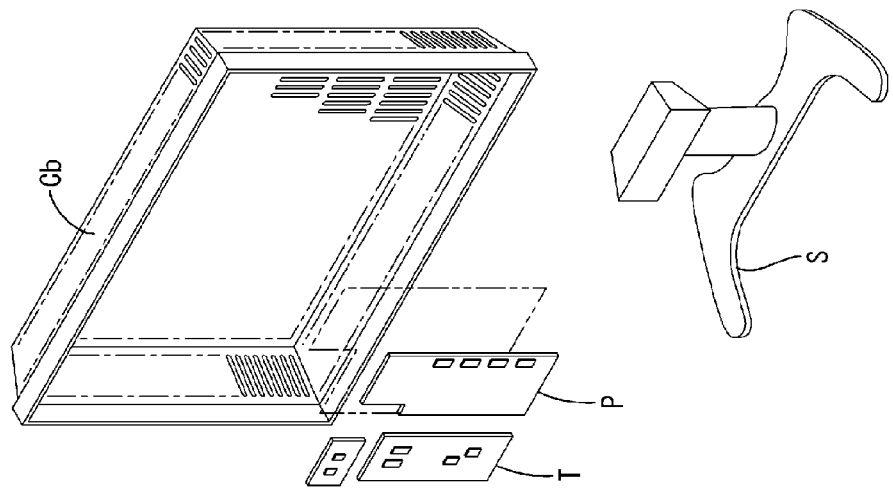
FIG. 1 is an exploded perspective view that shows a schematic configuration of a television receiver according to Embodiment 1.
Figure 1:
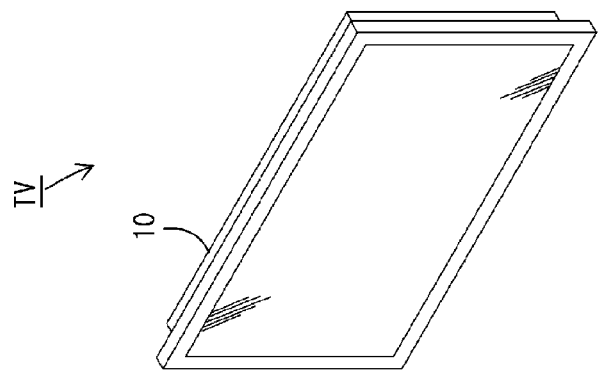
Figure 1:
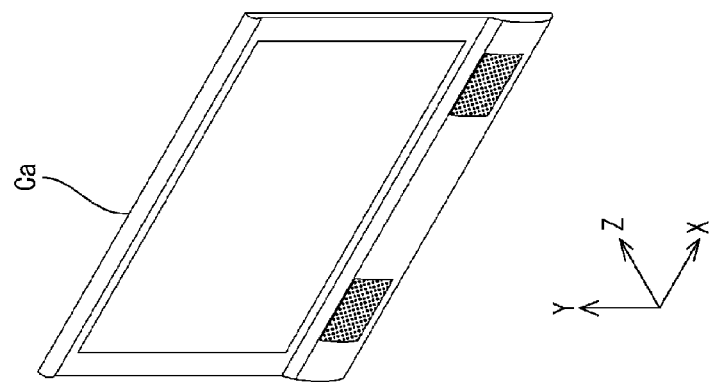
Figure 2:
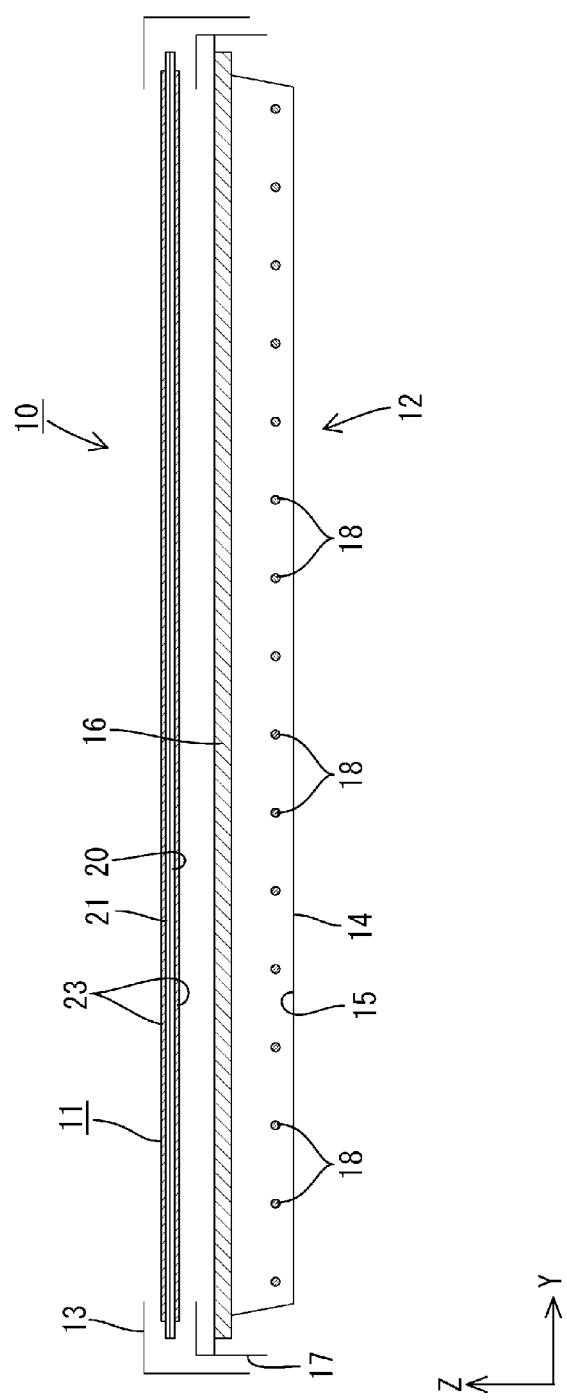
FIG. 2 is a cross-sectional view that schematically shows a cross-sectional configuration of a liquid crystal display device.

FIG. 1 is an exploded perspective view showing a schematic configuration of a television receiver according to Embodiment 1. FIG. 2 is a cross-sectional view schematically showing a cross-sectional configuration of the liquid crystal display device. As shown in FIG. 1, a television receiver TV includes the liquid crystal display device (the display device) 10, a front and a back cabinet Ca and Cb that sandwich the liquid crystal display device 10 to store it, a power source P, a tuner T, and a stand S. The liquid crystal display device 10 is a horizontally-long quadrilateral shape as a whole, and as shown in FIG. 2, is provided with a liquid crystal panel 11, which is a display panel, and a backlight device (an illumination device) 12, which is an external light source. These are formed so as to be integrally held by a bezel 13 or the like.

The backlight device 12 is formed so as to have a light source arranged directly below the back side of the liquid crystal panel 11, and is a so-called direct-lit type. The backlight device 12 is formed by having: a chassis 14 with an opening on the front side (the light-exiting side, the liquid crystal panel 11 side); a reflective sheet (a reflective member) 15 laid inside this chassis 14; an optical member 16 installed on the opening portion of the chassis 14; a frame 17 for holding the optical member 16; a plurality of cold cathode fluorescent lamps (light sources) 18 stored in a parallel state inside the chassis 14; and a lamp holder (not shown) that shields the end parts of the cold cathode fluorescent lamps 18 from light and that has light reflection properties.

The liquid crystal panel 11 mainly includes a transparent array substrate (an active matrix substrate) 20, a transparent opposite substrate (a color-filter substrate) 21 that is arranged so as to oppose this array substrate 20, and a liquid crystal layer sealed between these. This liquid crystal layer contains a liquid crystal material, which is a substance having optical characteristics that change depending on an applied electrical field. The array substrate 20 is arranged on the rear side (the backlight device 12 side) of the liquid crystal panel 11, and the opposite substrate 21 is arranged on the front side (the light-exiting side) thereof. A pair of polarizing plates 23 and 23 is bonded on the respective outer surfaces of the two substrates 20 and 21.

Figure 3:
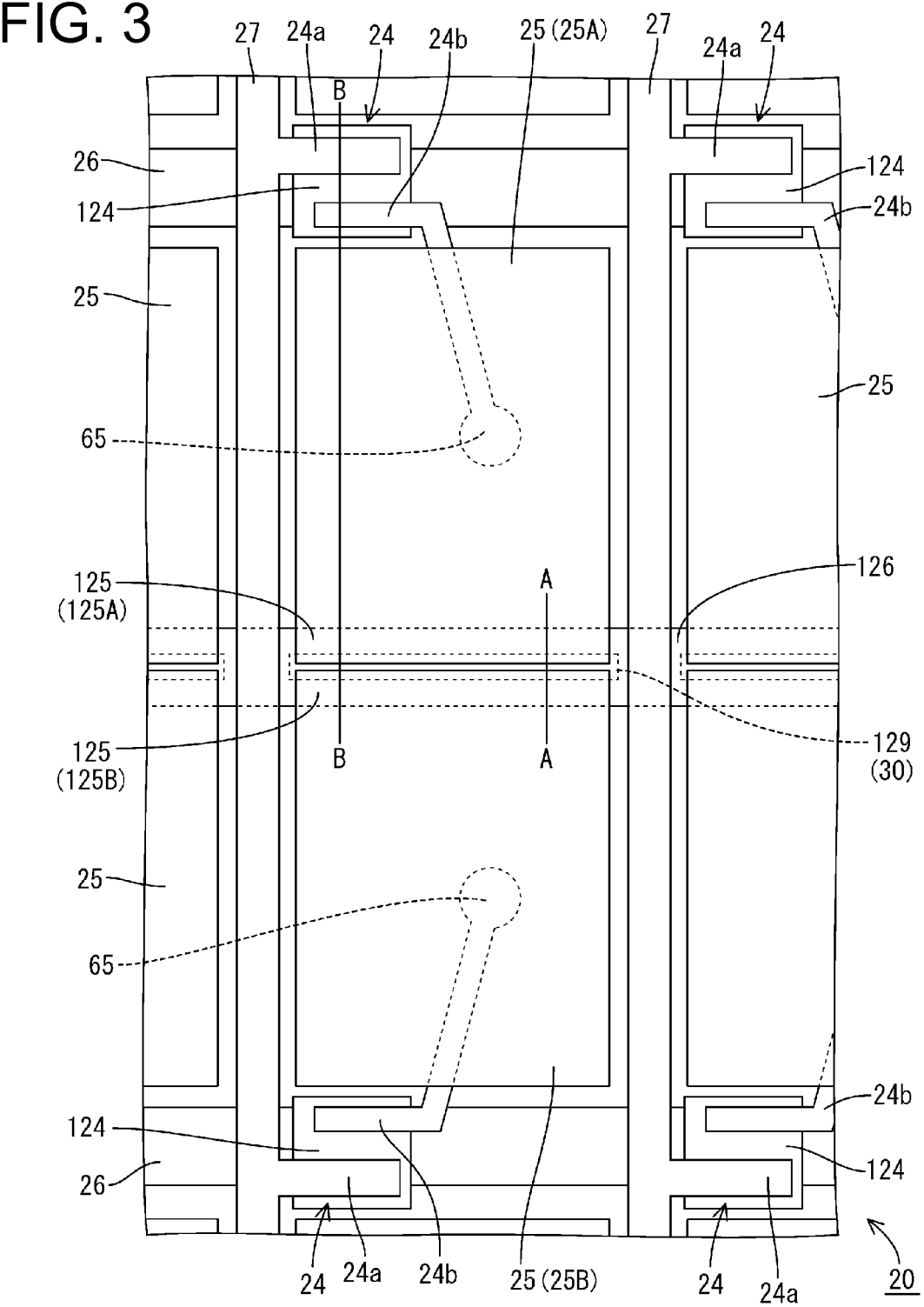
FIG. 3 is a plan view that schematically shows a pixel configuration in an array substrate of a liquid crystal panel.

The array substrate 20 will be explained below. FIG. 3 is a plan view schematically showing a pixel configuration of the array substrate of the liquid crystal panel. The array substrate 20 includes a transparent glass substrate (hereinafter, a transparent substrate), and a plurality of thin-film transistors (hereinafter, TFTs) 24, pixel electrodes 25, and the like arranged in a matrix on the inner surface side (the liquid crystal layer side, the surface side opposing the opposite substrate) of the transparent substrate. The TFTs 24 are used as switching elements, and the pixel electrodes 25 are electrically connected to these TFTs 24. The TFTs 24 are made of a semiconductor element, and contain a semiconductor film 124 made of amorphous silicon (a-Si) or the like. The pixel electrodes 25 are made of a transparent conductive film such as ITO (indium tin oxide), for example.

Each pixel is assigned one TFT 24 and one pixel electrode 25. The pixel electrode 25 assigned to each pixel is demarcated by a gate wiring line 26, a capacitance wiring line 126, and source wiring lines 27 formed on the inner surface side of the transparent substrate. The gate wiring lines 26 supply scan signals to the TFT 24 of each pixel, the capacitance wiring lines 126 supply electrical signals for forming capacitance for each pixel, and the source wiring lines 27 supply image signals to each pixel. These wiring lines 26, 126, and 27 are all made of a conductive material.

A plurality of the gate wiring lines 26 are formed on the inner surface side of the transparent substrate so as to line up in parallel with each other. A plurality of the capacitance wiring lines 126 are formed on the inner surface side of the transparent substrate so as to be arranged between the gate wiring lines 26 and 26 adjacent to each other. A plurality of the source wiring lines 27 are formed on the inner surface side of the transparent substrate so as to respectively intersect with the gate wiring lines 26 and the capacitance wiring lines 126.

The TFT 24 assigned to each pixel is disposed so as to oppose the gate wiring line 26 via a first insulating film, as described later. The TFT 24 includes a source electrode 24a and a drain electrode 24b, the source electrode 24a is connected to the source wiring line 27, and the drain electrode 24b is connected to the pixel electrode 25.

The pixel electrode 25 (25A) shown in FIG. 3 is surrounded by the gate wiring line 26 and the capacitance wiring line 126, which run parallel with each other, and the two source wiring lines 27 and 27 that are formed so as to intersect with these, for example. As shown in FIG. 3, the pixel electrodes 25 of the present embodiment have a rectangular shape as a whole in a plan view, and a portion 125 (125A) that corresponds to one side of the outer edges of the pixel electrode 25 is arranged so as to overlap the capacitance wiring line 126 via the first insulating film and the like, as described later.

Another pixel electrode 25B, which is adjacent to the pixel electrode 25A described above across the capacitance wiring line 126, is also arranged so that the outer edge 125 (125B) thereof overlaps the capacitance wiring line 126.

Figure 4:
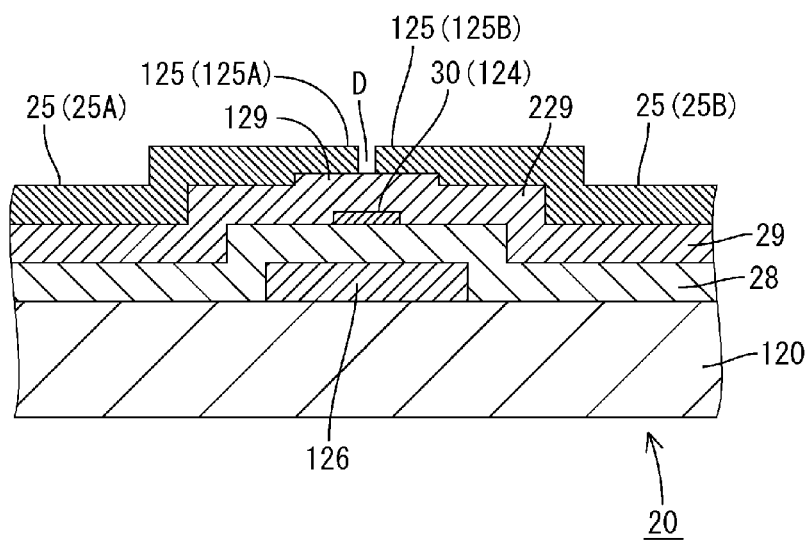
FIG. 4 is a cross-sectional view along the line A-A on the array substrate shown in FIG. 3.

FIG. 4 is a cross-sectional view along the line A-A on the array substrate shown in FIG. 3. As shown in FIG. 4, the array substrate 20 has the capacitance wiring line 126 formed on a transparent substrate 120, and a first insulating film 28 is formed on the transparent substrate 120 so as to cover the capacitance wiring line 126. A height-increasing part 30 is disposed on a portion of the first insulating film 28 covering the capacitance wiring line 126. This height-increasing part 30, as described later, is made of the same material as the semiconductor film used for the TFT 24, and is a linear protrusion that extends along the wiring direction of the capacitance wiring line 126. The width (the line width) of the height-increasing part 30 is set so as to be narrower than the line width of the capacitance wiring line 126.

As shown in FIG. 4, a second insulating film (an interlayer insulating film) 29 is formed so as to cover the height-increasing part 30 and the like. The portion of the second insulating film 29 that covers the height-increasing part 30 projects upward from below due to the height-increasing part 30, and the surface thereof is raised. This raised portion has a shape that extends along the wiring direction of the capacitance wiring line 126, in a manner similar to the height-increasing part 30, and in the present specification this portion, in particular, is referred to as a protruding band part 129. The protruding band part 129 of the present embodiment is arranged in the center of the capacitance wiring line 126.

As shown in FIG. 3, the outer edges 125 (125A and 125B) of the pixel electrodes 25 (25A and 25B) each ride up on the protruding band part 129. The outer edge 125A of the pixel electrode 25A, and the outer edge 125B of the adjacent pixel electrode 25B face each other while maintaining a distance (a gap) D on the protruding band part 129. The outer edges 125 of the pixel electrodes 25 are disposed so as to oppose the capacitance wire line 126 via the second insulating film 29 and the like. In other words, the outer edges 125 of the pixel electrodes 25 overlap the capacitance wiring line 126 in a plan view of the array substrate 20.

A terminal part from the gate wiring lines 26, a terminal part from the source wiring lines 27, and a terminal part from the capacitance wiring lines 126 are each disposed on an end part of the array substrate 20, and each of these terminal parts has signals inputted from external circuits, thereby controlling the driving of the TFT 24 in each pixel. An orienting film for aligning liquid crystal molecules in the liquid crystal layer is formed on the inner surface side of the array substrate 20.

Next, the opposite substrate 21 will be explained. The opposite substrate 21 has a plurality of color filters arranged in a matrix on a transparent glass substrate. These color filters are disposed so as to oppose respective pixel electrodes 25 on the array substrate 20, and are demarcated by a grid-shaped black matrix (a light-shielding part). This black matrix is disposed so as to oppose the gate wiring lines 26, the capacitance wiring lines 126, and the source wiring lines 27 on the array substrate 20. An orienting film for aligning liquid crystal molecules inside the liquid crystal layer is also formed on the inner surface side of the opposite substrate 21.

Manufacturing steps for the array substrate 20 will be explained below. The manufacturing process of the array substrate 20 of the present embodiment uses a total of four photomasks. Specifically, a first photomask is used to form the patterned gate wiring lines 26 and capacitance wiring lines 126, a second photomask is used to form the patterned source electrodes 24a, drain electrodes 24b, source wiring lines 27, semiconductor films 124, and the height-increasing parts 30, a third photomask is used to form the patterned second insulating film 29, and a fourth photomask is used to form the patterned pixel electrodes 25.

In the present embodiment, a half tone mask that contains a semi-transmissive film capable of changing the exposure amount for each area, or a gray tone mask that contains semi-transmissive areas using slits, is used as the second photomask. Each manufacturing step is explained in detail below with reference to FIGS. 5 to 13. FIGS. 5 to 13 show a portion corresponding to the cross-section along the line B-B on the array substrate 20 shown in FIG. 3.

Figure 5:
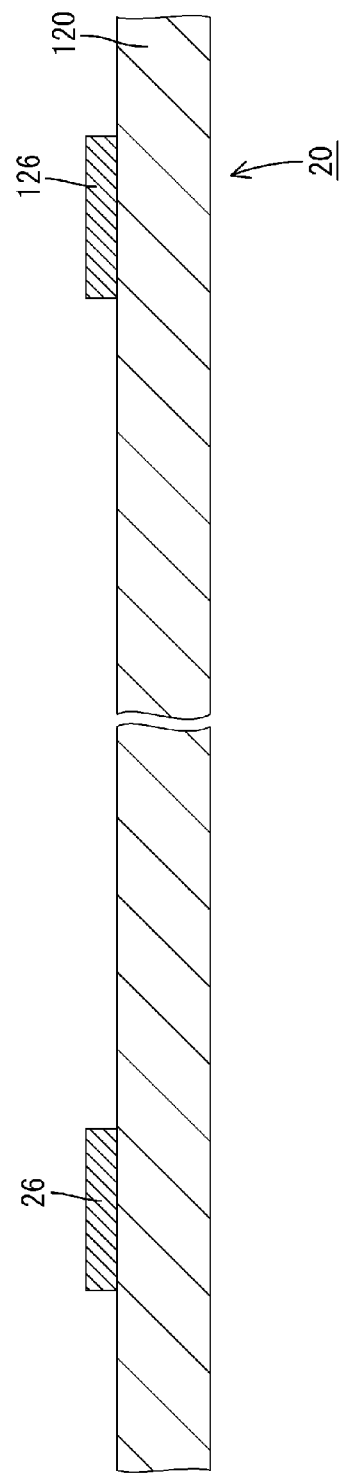
FIG. 5 is a view showing a step to form a gate wiring line and a capacitance wiring line on a transparent substrate.

FIG. 5 is a view showing a step to form the gate wiring line and the capacitance wiring line on the transparent substrate. First, the surface of the transparent substrate 120, which acts as the base portion of the array substrate 20, is cleaned. Afterwards, a metal film with a prescribed thickness is formed on the front surface of the dried transparent substrate 120. This metal film is formed using sputtering, for example. The metal layer is made of a single body (single layer) metal film made of aluminum (Al), chromium (Cr), tantalum (Ta), titanium (Ti), copper (Cu), or the like, a multilayer material where a metal nitride has been laminated onto these, or the like, for example.

Next, photoresist is coated onto the metal film, and a photoresist layer (a first photoresist layer) is formed on the entire surface of the metal film. Afterwards, the photoresist layer is exposed to light via the first photomask. The first photomask has a first pattern made of a transmissive part and a light-shielding part. After exposure, a developing solution is used to develop the photoresist layer, thereby forming a pattern based on the first pattern in the photoresist layer. The metal film is etched (wet etched or dry etched, for example) with the patterned photoresist layer as the mask. Then, as shown in FIG. 5, the respectively patterned gate wiring line 26 and capacitance wiring line 126 are formed on the transparent substrate 120.

Figure 6:
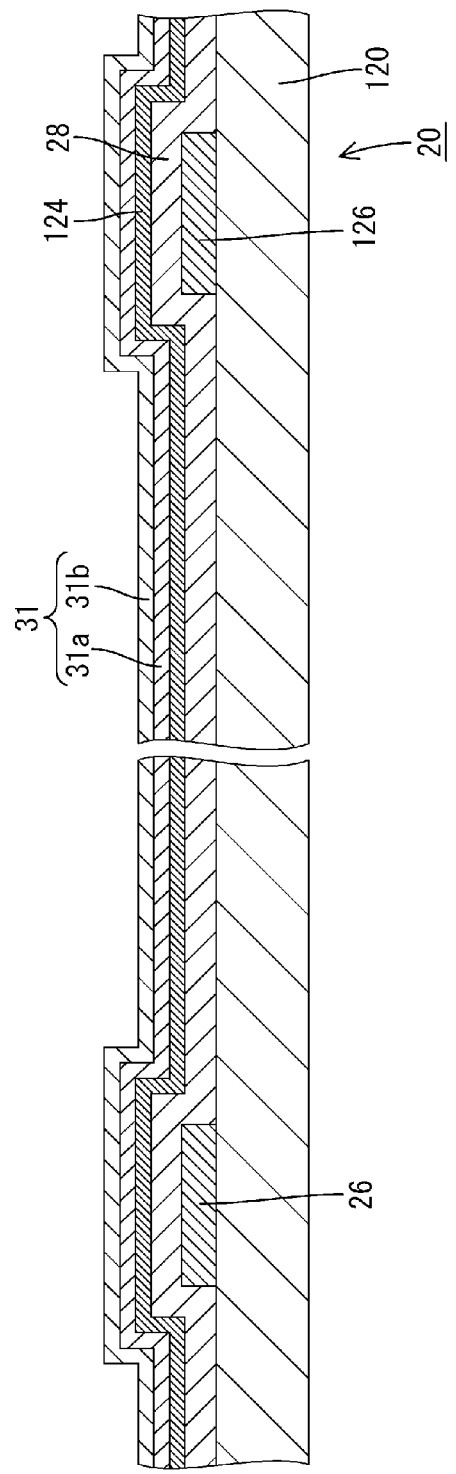
FIG. 6 is a view showing a step to form a first insulating film, a semiconductor film, and a conductive film on the transparent substrate.

FIG. 6 is a view showing a step to form the first insulating film, the semiconductor film, and the conductive film on the transparent substrate. As shown in FIG. 6, the first insulating film 28, the semiconductor film 124, and the conductive film 31 are layered in this order on the transparent substrate 120, which has the gate wiring line 26 and the capacitance wiring line 126 formed thereon. Among these, the conductive film 31 has a double-layer structure and includes a lower layer first conductive film 31a made of a doped semiconductor film, and an upper layer second conductive film 31b made of a metal film.

The first insulating film 28 is made of a so-called gate insulating film, and is formed on the transparent substrate 120 so as to cover the gate wiring line 26 and the capacitance wiring line 126. The first insulating film 28 is formed using a CVD (chemical vapor deposition) method such as plasma-enhanced CVD, for example. The first insulating film 28 is made of silicon nitride (SiNx), silicon oxide (SiOx), or the like, for example. The semiconductor film 124 is formed using a CVD (chemical vapor deposition) method such as plasma-enhanced CVD, for example. The semiconductor film 124 is made of amorphous silicon (a-Si) or the like, for example.

The first conductive film 31a is formed by sputtering, for example. The first conductive film 31a is made of amorphous silicon (n+Si) or the like doped with an n-type impurity such as phosphorous (P) at a high concentration, for example. The second conductive film 31b is formed by sputtering, for example. The second conductive film 31b is made of a single body (single layer) metal film made of aluminum (Al), chromium (Cr), tantalum (Ta), titanium (Ti), copper (Cu), or the like, a multilayer material where a metal nitride has been formed onto these, or the like, for example.

Next, photoresist is coated onto the second conductive film 31b, and a photoresist layer (a second photoresist layer) is formed on the entire surface of the second conductive film 31b. Afterwards, the photoresist layer is exposed to light via the second photomask. The second photomask is made of the half-tone mask or gray-tone mask as described above. A second pattern made of a transmissive part, a semi-transmissive part with less transmission than the transmissive part, and a light-shielding part are formed in this second photomask. After exposure, a developing solution is used to develop the photoresist layer, thereby forming a pattern based on the second pattern in the photoresist layer.

Figure 7:
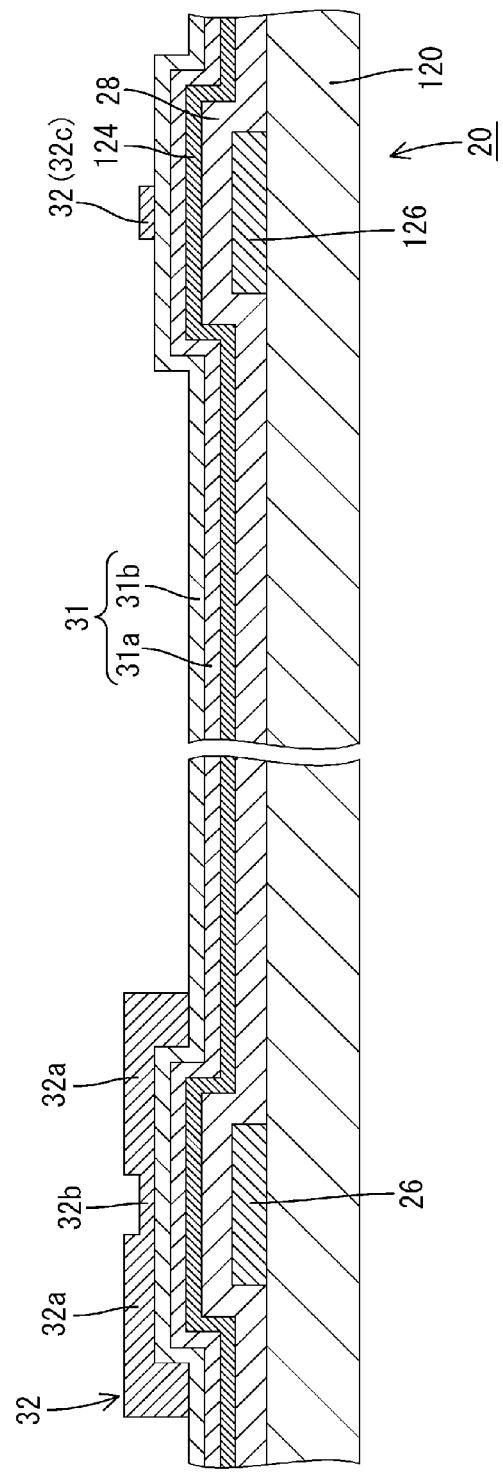
FIG. 7 is a view showing a step to form a patterned photoresist layer on a second conductive film.

FIG. 7 is a view showing a step to form a patterned photoresist layer on the second conductive film. As shown in FIG. 7, a photoresist layer 32 includes a thickest portion 32a, and portions 32b and 32c that are less thick than the portion 32a. In the present embodiment, the portion 32b and the portion 32c of the photoresist later 32 are set to both have the same thickness. When using a positive photoresist, for example, during exposure the thickest portion 32a corresponds to the light-shielding part of the second photomask, and the portion 32b and the portion 32c correspond to the semi-transmissive part. The portions where the photoresist layer 32 is not formed on the second conductive film 31b correspond to the transmissive part of the second photomask.

The portion 32a of the photoresist layer 32 corresponds to the source electrode and the drain electrode, the portion 32b corresponds to an opening area of the TFT 24 formed between the source electrode and drain electrode, and the portion 32c corresponds to the height-increasing part.

Figure 8:
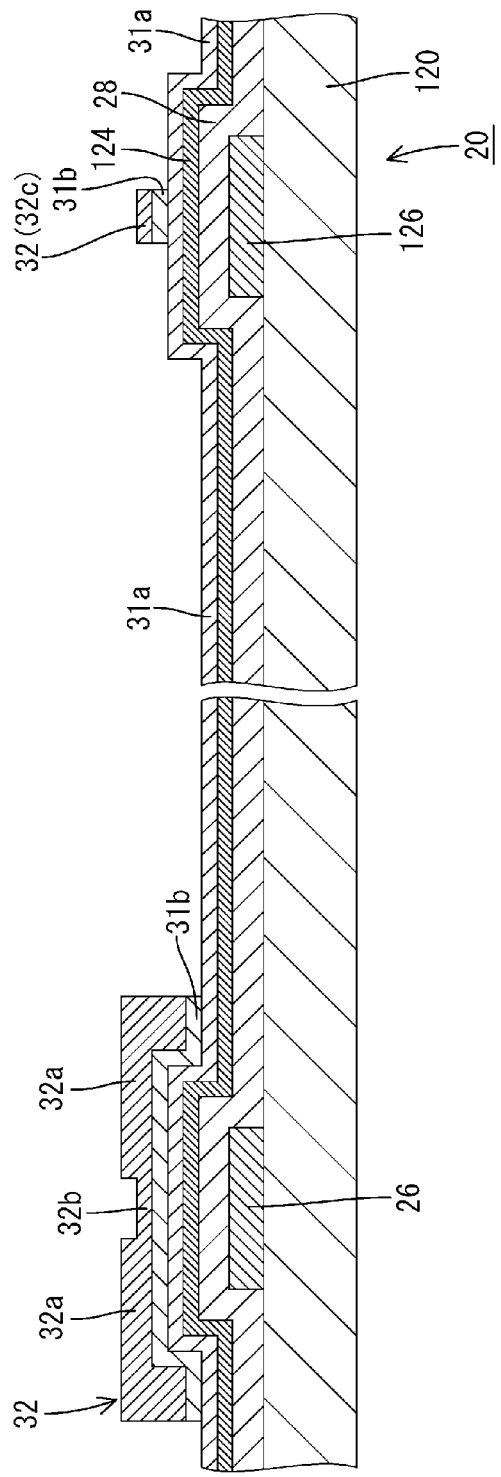
FIG. 8 is a view showing a step to wet etch the second conductive film.

Next, etching is done in two stages on the conductive film 31 and the semiconductor film 124 with the patterned photoresist layer 32 as the mask. First, wet etching is performed on the second conductive film 31b in the upper layer of the conductive film 31. FIG. 8 is a view showing the step for wet etching the second conductive film. As shown in FIG. 8, the portions of the second conductive film 31b not covered by the photoresist layer 32 (see FIG. 7) are removed by wet etching, and the portions of the second conductive film 31b covered by the photoresist layer 32 remain after wet etching.

Figure 9:
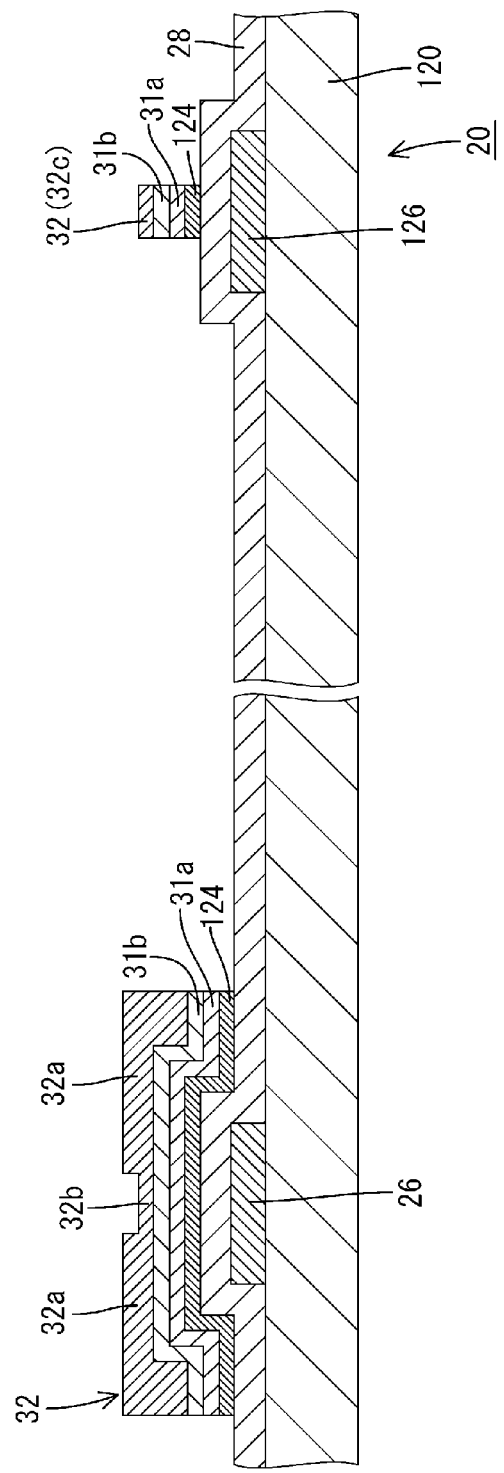
FIG. 9 is a view showing a step to dry etch the first conductive film and the semiconductor film.

Next, dry etching is performed on the first conductive film 31a and the semiconductor film 124 with the photoresist layer 32 as the mask. FIG. 9 is a view showing the step for dry etching the first conductive film and the semiconductor film. As shown in FIG. 9, the portions of the first conductive film 31a and the semiconductor film 124 (see FIG. 8) not covered by the photoresist layer 32 are removed by dry etching, and the portions of the first conductive film 31a and the semiconductor film 124 covered by the photoresist layer 32 remain after dry etching.

Figure 10:
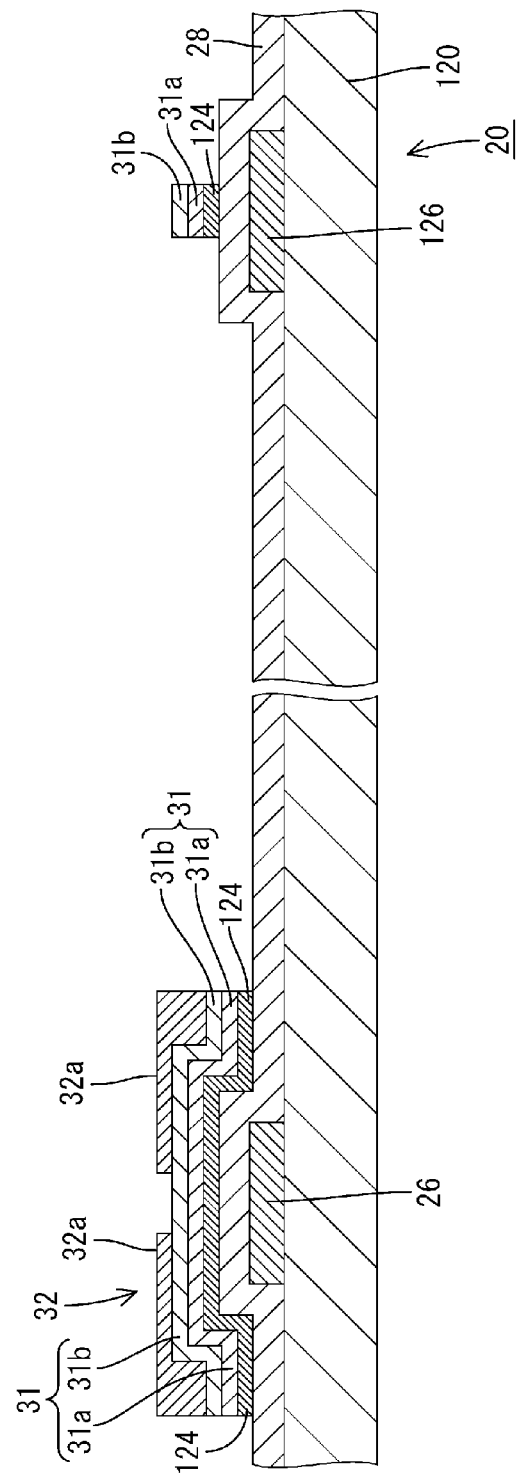
FIG. 10 is a view showing a step to perform ashing on the photoresist layer.

After etching is performed in two stages using the photoresist layer 32 as described above, ashing is performed on the photoresist layer 32. This ashing removes the thin portions 32b and 32c of the photoresist layer 32. Oxygen plasma is used for the ashing, for example. FIG. 10 is a view showing the step to perform ashing on the photoresist layer. As shown in FIG. 10, the thin portions 32b and 32c (see FIG. 9) of the photoresist layer 32 are scraped and removed. The portion 32a of the photoresist layer 32 is scraped by ashing to be made thinner.

Figure 11:
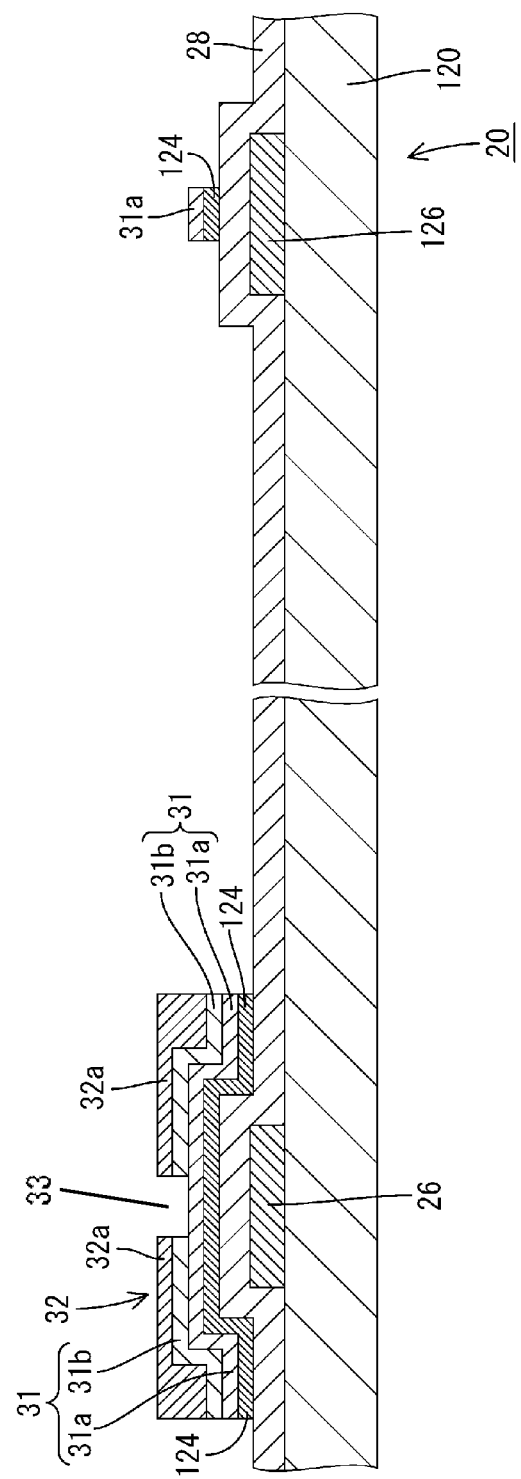
FIG. 11 is a view showing a step to wet etch a portion of the second conductive film corresponding to an opening area and a height-increasing part.

Next, etching is done in two stages on the conductive film 31 and the semiconductor film 124 with the photoresist layer 32, after ashing, as the mask. First, wet etching is performed on the second conductive film 31b in the upper layer of the conductive film 31. FIG. 11 is a view showing the step to wet etch the portion of the second conductive film corresponding to the opening area and the height-increasing part. As shown in FIG. 11, the portion of the second conductive film 31b corresponding to the opening area 33 and not covered by the photomask 32 is removed by wet etching. The portion of the second conductive film 31b disposed above the capacitance wiring line 126 is also removed by wet etching. This portion corresponds to the location where the height-increasing part will ultimately be formed. The portion of the second conductive film 31b covered by the photomask layer 32 remains after wet etching.

Figure 12:
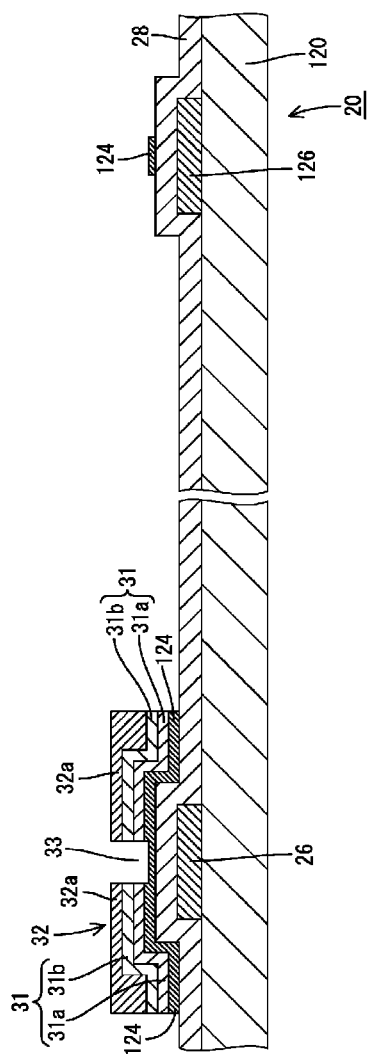
FIG. 12 is a view showing a step to dry etch a portion of the first conductive film and semiconductor film corresponding to the opening area and the height-increasing part.

Next, dry etching is performed on the first conductive film 31a and the semiconductor film 124 with the photoresist layer 32 as the mask. FIG. 12 is a view showing the step to dry etch the portion of the first conductive film and the semiconductor film corresponding to the opening area and the height-increasing part. As shown in FIG. 12, the portion of the first conductive film 31a corresponding to the opening area 33 and not covered by the photoresist layer 32 is removed by dry etching. The portion of the semiconductor film 124 corresponding to the opening area 33 has the surface thereof slightly scraped by dry etching, and only becomes as thin as the amount scraped. For the portion of the first conductive film 31a and the semiconductor film 124 corresponding to the height-increasing part above the capacitance wiring line 126, the first conductive film 31a is removed and the surface of the semiconductor film 124 is slightly scraped, in a manner similar to the portion corresponding to the opening area 33. The portion of the first conductive film 31a and the semiconductor film 124 covered by the photomask layer 32 remains after dry etching.

Figure 13:
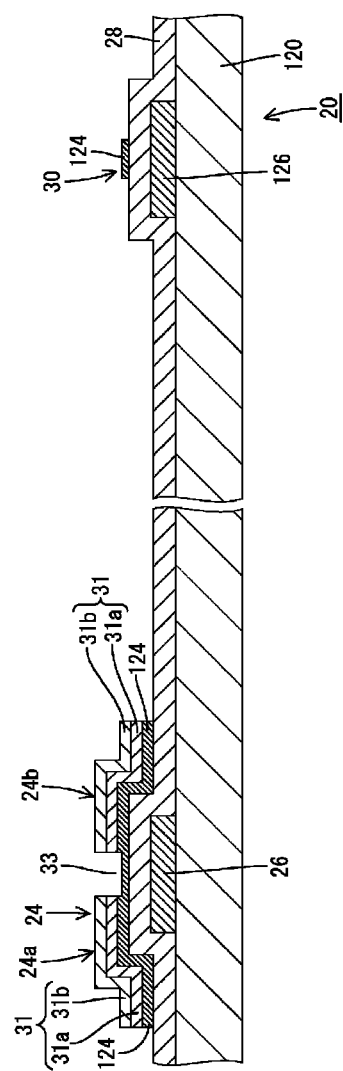
FIG. 13 is a view showing a step to perform ashing on the photoresist layer on the second conductive film.

Afterwards, oxygen plasma or the like is used to perform ashing on the photoresist layer 32, thereby removing the photoresist layer 32 from the second conductive film 31b. FIG. 13 is a view showing the step to perform ashing on the photoresist layer on the second conductive film. As shown in FIG. 13, ashing removes the photoresist layer 32 from the second conductive film 31b. Then, as shown in FIG. 13, the height-increasing part 30, which is made of the semiconductor film 124, is formed above the capacitance wiring line 126. The TFT 24 is formed above the gate wiring line 26. This TFT 24 includes the source electrode 24a made of the first conductive film 31a and the second conductive film 31b, which are disposed on the semiconductor film 124, and the drain electrode 24b also made of the first conductive film 31a and the second conductive film 31b.

After the TFT 24 and the height-increasing part 30 are formed as described above, the second insulating film (the interlayer insulating film) having a prescribed thickness is formed on the array substrate 20. The second insulating film is formed by plasma-enhanced CVD, for example. The second insulating film is made of an inorganic material such as silicon nitride (SiNx), an acrylic resin material, or the like, for example. A photoresist is coated onto the second insulating film. A photoresist layer (a third photoresist layer) is formed on the entire surface of the second insulating film.

Afterwards, this photoresist layer is exposed to light via the third photomask. The third photomask has a third pattern made of a transmissive part and a light-shielding part. After exposure, a developing solution is used to develop the photoresist layer, thereby forming a pattern based on the third pattern in the photoresist layer. The second insulating layer is etched (wet etched or dry etched) with the patterned photoresist layer as the mask, and afterwards the photoresist layer is removed by ashing. Then, the second insulating film is patterned, and contact holes 65 (see FIG. 3) used for connecting the pixel electrodes to the drain electrodes, and the like are formed in the second insulating film.

Next, a transparent conductive film with a prescribed thickness is formed on the array substrate 20. The transparent conductive film can be formed by sputtering, for example. The transparent conductive film is made of ITO, for example. The transparent conductive film is formed so as to cover the patterned second insulating film. Afterwards, photoresist is coated onto the transparent conductive film to form a photoresist layer (a fourth photoresist layer) on the entire surface thereof. This photoresist layer is exposed to light via the fourth photomask. The fourth photomask has a fourth pattern formed therein made of a transmissive part and a light-shielding part. After exposure, a developing solution is used to develop the photoresist layer, thereby forming a pattern based on the fourth pattern in the photoresist layer. The transparent conductive film is etched (wet etched or dry etched) with the patterned photoresist layer as the mask, and afterwards the photoresist layer is removed by ashing. As a result, the transparent conductive film is patterned, and the pixel electrodes 25 with a shape as shown in FIGS. 3 and 4 are obtained.

The array substrate 20 of the present embodiment that has been manufactured through the manufacturing steps described above can have a narrow distance set between the pixel electrodes 25 (25A and 25B) adjacent to each other across the capacitance wiring line 126 (see FIGS. 3 and 4). The reason for that will be explained below.

The present embodiment, as shown in FIG. 3, has the outer edge 125 (125A) of the pixel electrode 25 (25A), and the outer edge 125 (125B) of the pixel electrode 25 (25B) disposed on the second insulating film 29 so as to overlap the capacitance wiring line 126 as much as possible. The tip portions of the outer edges 125 are formed so as to ride up on the protruding band part 129 while maintaining the gap D.

The outer edges 125 (125A and 125B) of the pixel electrodes 25 (25A and 25B) formed in such a way rise from below to above the edges of the protruding band part 129. If the outer edges 125 (125A and 125B) of the pixel electrodes 25 (25A and 25B) are initially formed in such a state, then over time the outer edges 125 (125A and 125B) will slip slightly downwards from the ride-up state due to the weight thereof and the like. In other words, the outer edges 125 (125A and 125B) of the pixel electrodes 25 (25A and 25B) will over time become slightly farther apart from each other. However, the degree to which the outer edges 125 of the pixel electrodes 25 slip downwards from the protruding band part 129 is very small, and the capacitance formed between the pixel electrodes 25 and the capacitance wiring line 126 is normally barely affected.

Accordingly, it is possible for the array substrate 20 of the present embodiment to have a narrow distance set between the pixel electrodes 25 (25A and 25B) adjacent to each other across the capacitance wiring line 126. In the array substrate 20 of the present embodiment, as described above, the height-increasing part 30 and the TFT 24 can be formed in the same manufactured steps. Thus, it is possible to efficiently manufacture the array substrate 20 having the height-increasing part 30 using the same production equipment and without adding any manufacturing steps. The height-increasing part 30 formed on the array substrate 20 of the present embodiment is made of the same material as the semiconductor film 124 that the TFT 24 has, and does not contain a conductive material (conductive film 31).

Embodiment 2

Embodiment 2 of the present invention will be explained below with reference to FIGS. 14 and 15. In the present embodiment, an example is shown of an active matrix substrate (an array substrate) used for a liquid crystal panel of a liquid crystal display device 10, in a manner similar to Embodiment 1.

Figure 14:
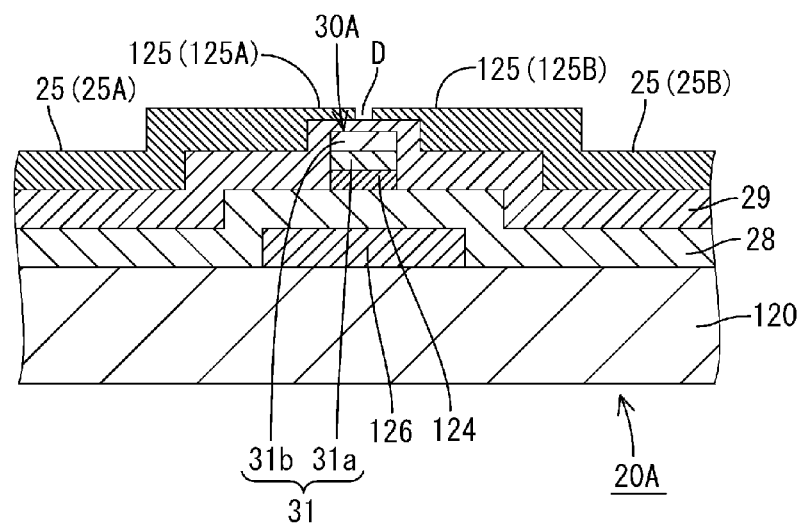
FIG. 14 is a cross-sectional view of an array substrate of Embodiment 2.
Figure 15:
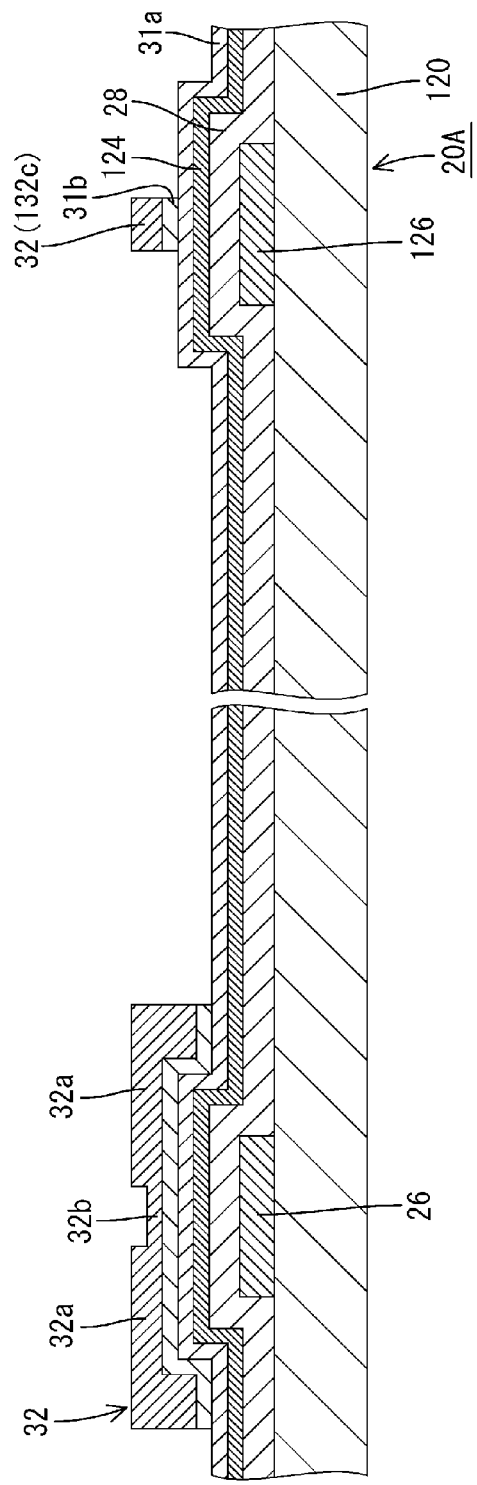
FIG. 15 is a view showing a manufacturing step for the array substrate of Embodiment 2.

FIG. 14 is a cross-sectional view of the array substrate of Embodiment 2. The basic structure of this array substrate 20A is similar to the structure in Embodiment 1. FIG. 14 shows a part of the array substrate 20A close to a capacitance wiring line 126, in a manner similar to the array substrate 20 of Embodiment 1 shown in FIG. 4. As shown in FIG. 14, a height-increasing part 30A of the present embodiment differs from Embodiment 1 in that the height-increasing part 30A is made of a conductive film 31 formed on a semiconductor film 124. In other words, the height of the height-increasing part 30A is set so as to be higher than in Embodiment 1.

As such, the conductive film 31, which is used as the material for a source electrode and the like, may be used as the material for the height-increasing part 30A along with the semiconductor film 124. FIG. 15 is a view showing a manufacturing step for the array substrate of Embodiment 2. The content shown in FIG. 15 corresponds to the content shown in FIG. 8 of Embodiment 1. The difference between the present embodiment and Embodiment 1 is that the thickness of a photoresist layer 32 formed on a portion corresponding to the height-increasing part 30A is set so as to be greater in the present embodiment than in Embodiment 1. In FIG. 15, the portion of the photoresist layer 32 disposed on the location corresponding to the height-increasing part 30A is shown by reference character 132c. The thickness of the photoresist layer 32 can be appropriately modified by adjusting the exposure amount of the photoresist layer 32.

As such, increasing the thickness of the part of the photoresist layer 32 corresponding to the height-increasing part 30A can leave the conductive film 31 (31a and 31b) above the semiconductor film 124. The array substrate 20A of the present embodiment can basically be manufactured by a manufacturing process similar to that in Embodiment 1 described above.

It is possible for the array substrate 20A of the present embodiment to also have a narrow distance set between pixel electrodes 25 (25A and 25B) adjacent to each other across the capacitance wiring line 126, in a manner similar to Embodiment 1. The array substrate 20A of the present embodiment can have the height-increasing part 30A formed in the same manufacturing steps as a TFT 24. Thus, it is possible to efficiently manufacture the array substrate 20A having the height-increasing part 30A using the same production equipment and without adding any manufacturing steps. The height-increasing part 30A formed on the array substrate 20A of the present embodiment is made of the same material as the TFT 24 (the semiconductor film 124 and the conductive film 31).

Embodiment 3

Embodiment 3 of the present invention will be explained below with reference to FIGS. 16 and 17. In the present embodiment, an example is shown of an active matrix substrate (an array substrate) used for a liquid crystal panel of a liquid crystal display device 10, in a manner similar to Embodiment 1.

Figure 16:
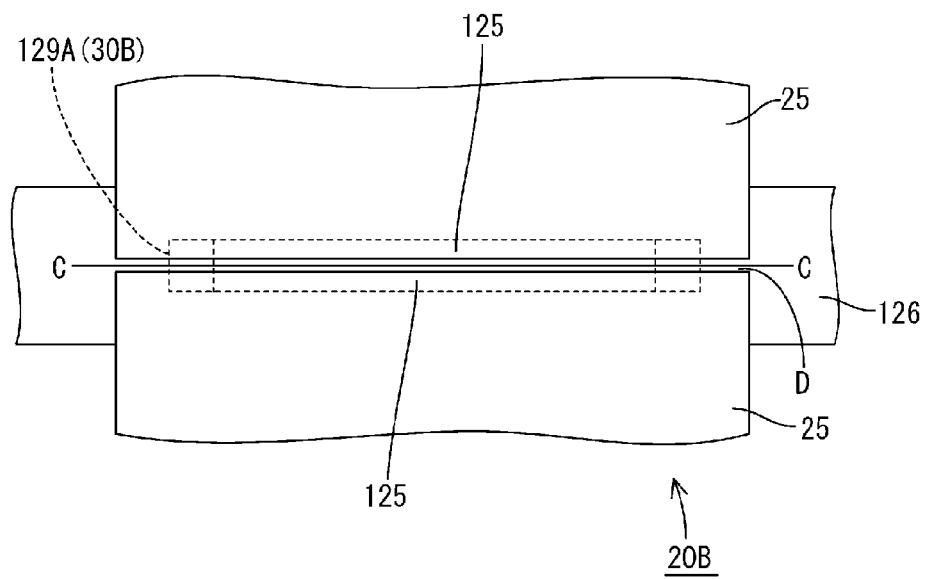
FIG. 16 is a plan view showing outer edges of a pixel electrode in an array substrate of Embodiment 3.

FIG. 16 is a plan view showing outer edges of pixel electrodes in the array substrate of Embodiment 3. FIG. 17 is a cross-sectional view along the line C-C on the array substrate shown in FIG. 16. The basic structure of the array substrate 20B of the present embodiment is similar to the structure in Embodiment 1. However, a height-increasing part 30B on the array substrate 20B of the present embodiment has a different shape than in Embodiment 1 (or 2).

Figure 17:
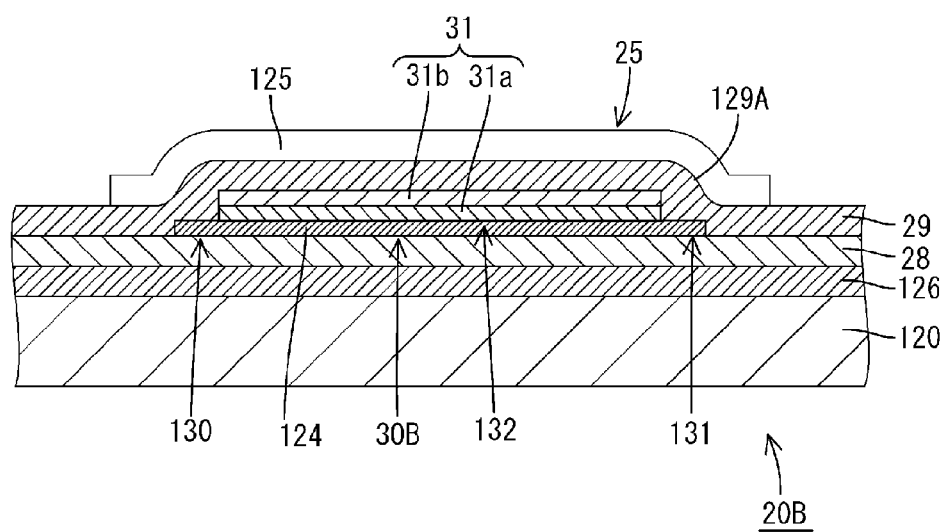
FIG. 17 is a cross-sectional view along the line C-C on the array substrate shown in FIG. 16.

As shown in FIG. 17, the height-increasing part 30B of the present embodiment has a structure that extends linearly along the wiring direction of a capacitance wiring line 126, in a manner similar to Embodiment 1, but the height of both end parts 130 and 131 of the height-increasing part 30B are set lower than the height of a middle part 132, which is the portion interposed therebetween. The two end parts 130 and 131 are essentially made of a semiconductor film 124, and the middle part 132 is made of the semiconductor film 124 and a conductive film 31 (31a and 31b). When the height-increasing part 30B has such a shape, the shape of a protruding band part 129A formed on a second insulating film 29 that covers the top of the height-increasing part 30B assumes the shape of the height-increasing part 30B. In other words, the height of both ends of the protruding band part 129A is lowered, and the height of the portion interposed therebetween is higher than both of the ends. In the present embodiment, the surface of the portion of the protruding band part 129A corresponding to the middle part 132 is flat.

When the shape of the height-increasing part 30B is set as such, a groove (a distance D) for separating the adjacent pixel electrodes 25 and 25 from each other is easier to form when wet etching a transparent conductive film to pattern the pixel electrodes 25. During wet etching, unnecessary portions of the transparent conductive film (portions corresponding to the groove, for example) need to be removed along with the solvent. As in the present embodiment, when the height of both ends of the protruding band part 129A has been lowered, both ends of outer edges 125 of the pixel electrodes 25 will slant downwards, and thus the portion of the transparent conductive film corresponding to the groove becomes easier to remove along with the solvent. Then, the leaving behind of transparent conductive film between the pixel electrodes 25 and 25 without being removed (the so-called film residue) is suppressed.

Embodiment 4

Figure 18:
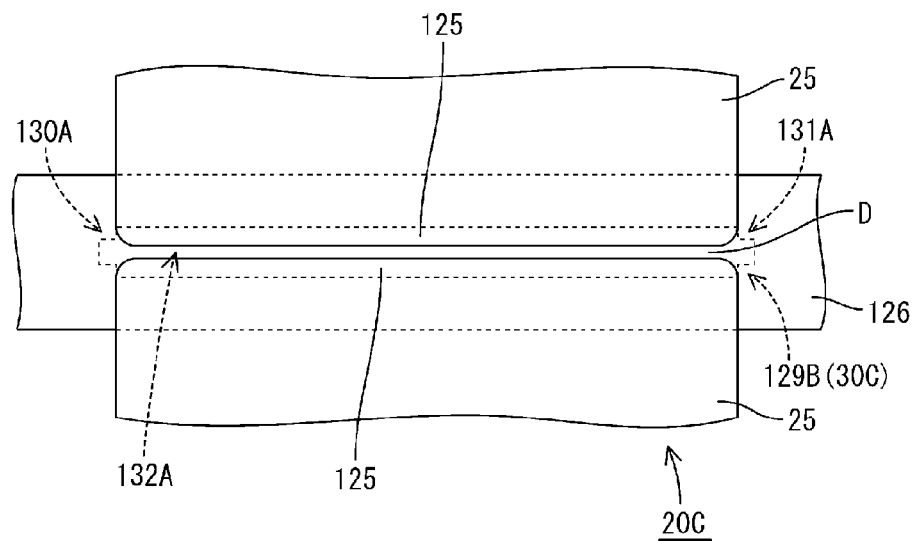
FIG. 18 is a plan view showing outer edges of a pixel electrode in an array substrate of Embodiment 4.

Embodiment 4 of the present invention will be explained below with reference to FIG. 18. In the present embodiment, an example is shown of an active matrix substrate (an array substrate) used for a liquid crystal panel of a liquid crystal display device 10, in a manner similar to Embodiment 1. FIG. 18 is a plan view showing outer edges of pixel electrodes in the array substrate of Embodiment 4. The basic structure of the array substrate 20C of the present embodiment is similar to the structure in Embodiment 1. However, a height-increasing part 30C on the array substrate 20C of the present embodiment has a different shape than in Embodiment 1.

As shown in FIG. 18, the height-increasing part 30C of the present embodiment has a structure that extends linearly along the wiring direction of a capacitance wiring line 126, in a manner similar to Embodiment 1, but the line widths of both end parts 130A and 131A of the height-increasing part 30C are set narrower than the line width of a middle part 132A, which is the portion interposed therebetween. The height-increasing part 30C is made of a similar semiconductor film 124 to that used in a TFT 24, in a manner similar to Embodiment 1, and the thickness is uniform. The height-increasing part 30C of the present embodiment is patterned so as to have such as shape in a manufacturing step thereof.

When the height-increasing part 30C has such a shape, the shape of a protruding band part 129B formed on a second insulating film 29 that covers the top of the height-increasing part 30C assumes the shape of the height-increasing part 30C. In this case, both end portions of the protruding band part 129B become flat. As a result, a groove (a distance D) for separating the adjacent pixel electrodes 25 and 25 from each other is easier to form when wet etching a transparent conductive film to pattern the pixel electrodes 25. As described above, during wet etching unnecessary portions of the transparent conductive film (portions corresponding to the groove, for example) need to be removed along with the solvent. As in the present embodiment, when the shape of both ends of the protruding band part 129B has been made smooth, the portion of the transparent conductive film corresponding to the groove becomes easier to remove along with the solvent. Therefore, the leaving behind of transparent conductive film between the pixel electrodes 25 and 25 (the so-called film residue) is suppressed. Furthermore, it is also easier for the solvent to enter the portion corresponding to the groove (the gap in the patterned photoresist layer formed on the transparent conductive film).

Embodiment 5

Figure 19:
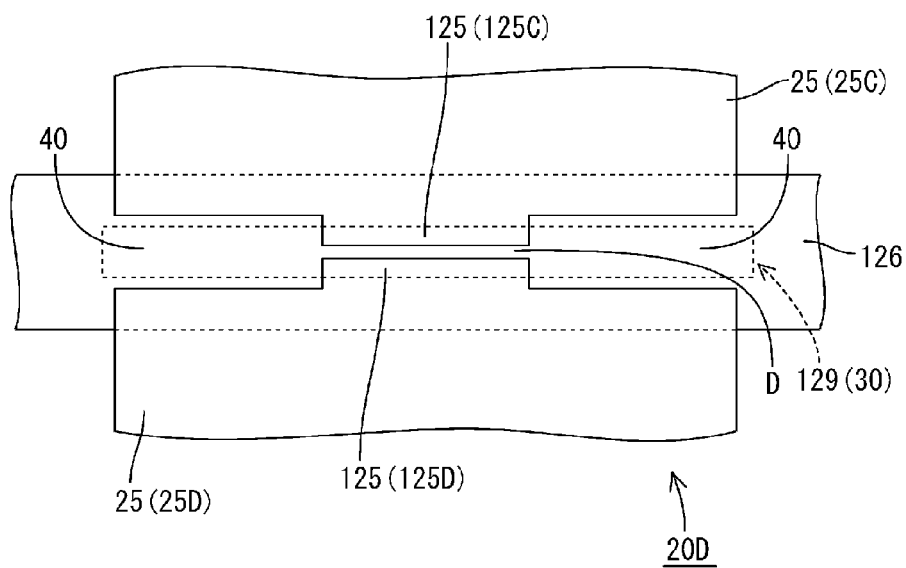
FIG. 19 is a plan view showing outer edges of a pixel electrode in an array substrate of Embodiment 5.

Embodiment 5 of the present invention will be explained below with reference to FIG. 19. In the present embodiment, an example is shown of an active matrix substrate (an array substrate) used for a liquid crystal panel of a liquid crystal display device 10, in a manner similar to Embodiment 1. FIG. 19 is a plan view showing outer edges of pixel electrodes in the array substrate of Embodiment 5. The basic structure of the array substrate 20D of the present embodiment is similar to the structure in Embodiment 1. However, the shape of the outer edges 125 (125C and 125D) of the pixel electrodes 25 (25C and 25D) on the array substrate 20D of the present embodiment is different than that in Embodiment 1.

As shown in FIG. 19, the outer edges 125 (125C and 125D) of the pixel electrodes 25 (25C and 25D) on the array substrate 20D of the present embodiment have only a center portion thereof riding up on a protruding band part 129. Both of the end portions of the outer edges 125 (125C and 125D) are cut out. In other words, the outer edges 125 (125C and 125D) of the pixel electrodes 25 (25C and 25D) have a belt shape that extends along a capacitance wiring line 126, and have a cut-out part at both ends of the end parts of the belt-shape. When the array substrate 20D is viewed in a plan view, the length of the pixel electrodes 25 (25C and 25D) in a source wiring line direction is set so that both end portions are shorter than the central portion. Thus, large gaps 40 and 40 are formed in spaces between the pixel electrodes 25 (25C and 25D) between the cut-out portions.

When the shape of the outer edges 125 (125C and 125D) of the pixel electrodes 25 (25C and 25D) is set as such, it is possible to suppress the occurrence of film residue in a groove (a distance D) for separating the adjacent pixel electrodes 25 and 25 from each other when wet etching a transparent conductive film to pattern the pixel electrodes 25 (25C and 25D). In other words, because there are the large gaps 40 and 40 in front of and behind the groove (the distance D) between the pixel electrodes 25 (25C and 25D), the portion of the transparent conductive film corresponding to the groove becomes easier to remove along with the solvent during wet etching. Furthermore, it is also easier for the solvent to enter the portion corresponding to the groove (the gap in the patterned photoresist layer formed on the transparent conductive film).

Embodiment 6

Figure 20:
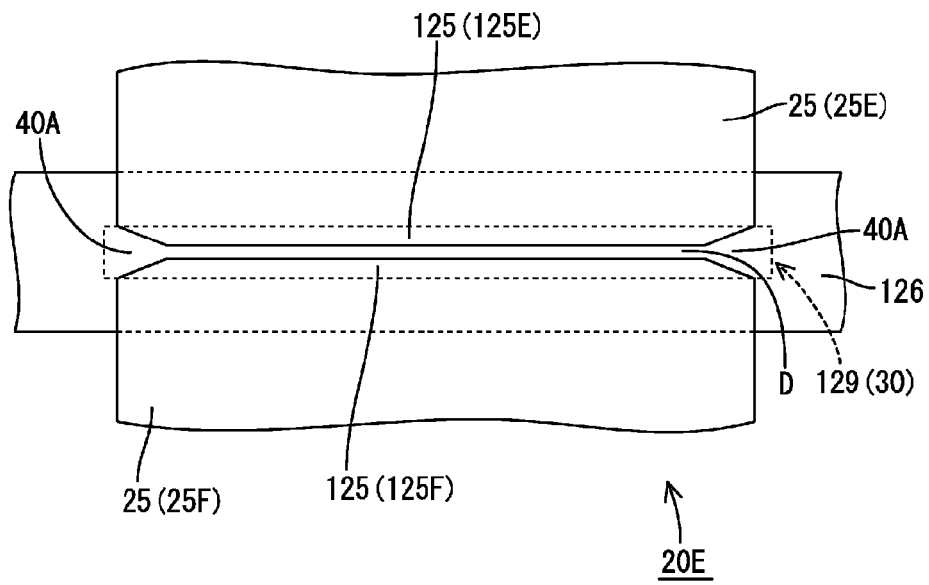
FIG. 20 is a plan view showing outer edges of a pixel electrode in an array substrate of Embodiment 6.

Embodiment 6 of the present invention will be explained below with reference to FIG. 20. In the present embodiment, an example is shown of an active matrix substrate (an array substrate) used for a liquid crystal panel of a liquid crystal display device 10, in a manner similar to Embodiment 1. FIG. 20 is a plan view showing outer edges of pixel electrodes in the array substrate of Embodiment 6. The basic structure of the array substrate 20E of the present embodiment is similar to the structure in Embodiment 1. However, the shape of the outer edges 125 (125E and 125F) of the pixel electrodes 25 (25E and 25F) on the array substrate 20E of the present embodiment is different than that in Embodiment 1.

As shown in FIG. 20, both end portions of the outer edges 125 (125E and 125F) of the pixel electrodes 25 (25E and 25F) on the array substrate 20E of the present embodiment are cut out in a tapered shape. In other words, the outer edges 125 (125E and 125F) of the pixel electrodes 25 (25E and 25F) have a belt shape that extends along a capacitance wiring line 126, and have a cut-out part at both ends of the end parts of the belt-shape. Thus, large gaps 40A and 40A are formed in spaces between the pixel electrodes 25 (25E and 25F) between the cut-out portions.

When the shape of the outer edges 125 (125E and 125F) of the pixel electrodes 25 (25E and 25F) is set as such, it is possible to suppress the occurrence of film residue in a groove (a distance D), for separating the adjacent pixel electrodes 25 and 25 from each other, when wet etching a transparent conductive film to pattern the pixel electrodes 25 (25E and 25F). In other words, because there are the large gaps 40A and 40A in front of and behind the groove (the distance D) between the pixel electrodes 25 (25E and 25F), the portion of the transparent conductive film corresponding to the groove becomes easier to remove along with the solvent during wet etching. Furthermore, it is also easier for the solvent to enter the portion corresponding to the groove (the gap in the patterned photoresist layer formed on the transparent conductive film).

Embodiment 7

Figure 21:
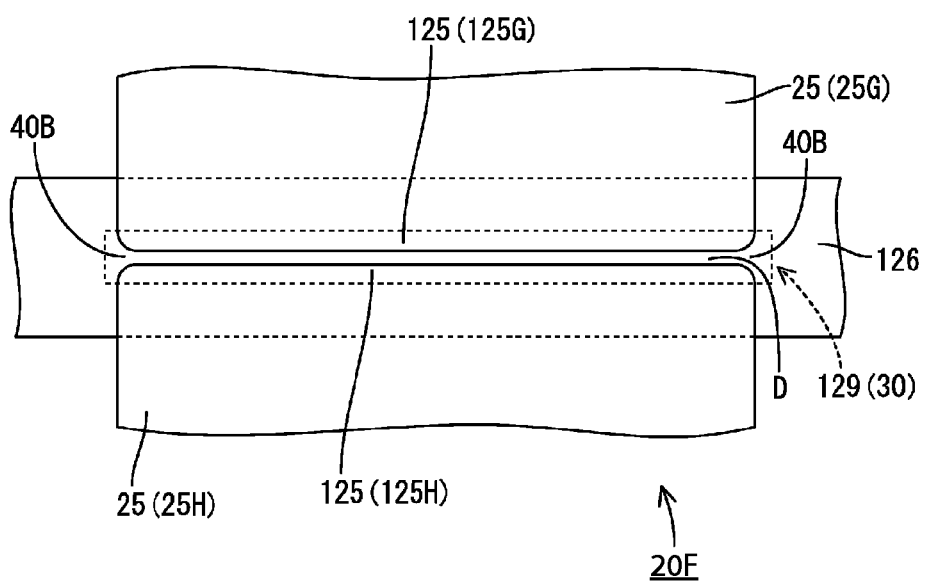
FIG. 21 is a plan view showing outer edges of a pixel electrode in an array substrate of Embodiment 7.

Embodiment 7 of the present invention will be explained below with reference to FIG. 21. In the present embodiment, an example is shown of an active matrix substrate (an array substrate) used for a liquid crystal panel of a liquid crystal display device 10, in a manner similar to Embodiment 1. FIG. 21 is a plan view showing outer edges of pixel electrodes in the array substrate of Embodiment 7. The basic structure of the array substrate 20F of the present embodiment is similar to the structure in Embodiment 1. However, the shape of the outer edges 125 (125G and 125H) of the pixel electrodes 25 (25G and 25H) on the array substrate 20F of the present embodiment is different than that in Embodiment 1.

As shown in FIG. 21, both end portions of the outer edges 125 (125G and 125H) of the pixel electrodes 25 (25G and 25H) on the array substrate 20F of the present embodiment are cut out so as to be rounded (so as to be a curved shape). In other words, the outer edges 125 (125G and 125H) of the pixel electrodes 25 (25G and 25H) have a belt shape that extends along a capacitance wiring line 126, and have a cut-out part at both ends of the end parts of the belt-shape. Thus, large gaps 40B and 40B are formed in spaces between the pixel electrodes 25 (25G and 25H) between the cut-out portions.

When the shape of the outer edges 125 (125G and 125H) of the pixel electrodes 25 (25G and 25H) is set as such, it is possible to suppress the occurrence of film residue in a groove (a distance D), for separating the adjacent pixel electrodes 25 and 25 from each other, when wet etching a transparent conductive film to pattern the pixel electrodes 25 (25G and 25H). In other words, because there are the large gaps 40B and 40B in front of and behind the groove (the distance D) between the pixel electrodes 25 (25G and 25H), the portion of the transparent conductive film corresponding to the groove becomes easier to remove along with the solvent during wet etching. Furthermore, it is also easier for the solvent to enter the portion corresponding to the groove (the gap in the patterned photoresist layer formed on the transparent conductive film).

Other Embodiments

The present invention is not limited to the embodiments shown in the drawings and described above, and the following embodiments are also included in the technical scope of the present invention, for example.

(1) In the embodiments described above, a height-increasing part was made of a semiconductor film used for a TFT, or a laminate of a semiconductor film and a conductive film, but in other embodiments the height-increasing part may be formed of a separately prepared insulating material or the like, for example.

(2) In the embodiments described above, a height-increasing part was arranged in the center of a capacitance wiring line, but as long as the aims of the present invention are able to be achieved, in other embodiments the height-increasing part may be arranged in a location other than the center of the capacitance wiring line.

(3) In the embodiments described above, a continuous material was used along the wiring line direction of a capacitance wiring line in each pixel for a height-increasing part, but as long as the aims of the present invention are able to be achieved, in other embodiments the height-increasing part may be segmented along the way.

(4) In the embodiments described above, the shape of outer edges of adjacent pixel electrodes was mutually the same, but as long as the aims of the present invention can be achieved, in other embodiments the shape of the outer edges of the pixel electrodes may be mutually different, for example.

(5) A height-increasing part may be disposed for all pixels, or as necessary may be disposed for certain pixels.

(6) In the embodiments described above, a liquid crystal display device that performs color display was used, but the present invention can also be applied to a liquid crystal display device that performs black and white display.

(7) In the embodiments described above, a television receiver having a tuner was described, but the present invention can also be applied to a display device that does not have a tuner.

DESCRIPTION OF REFERENCE CHARACTERS 10 liquid crystal display device (display device)
11 liquid crystal panel (display panel)
12 illumination device
13 bezel
14 chassis
16 optical member
17 frame 18 cold cathode fluorescent lamp (light source)
20 array substrate (active matrix substrate)
21 opposite substrate
24 TFT
24a source electrode
24b drain electrode
25 pixel electrode
125 outer edge of pixel electrode
26 gate wiring line
126 capacitance wiring line
27 source wiring line
30 height-increasing part
129 protruding band part
124 semiconductor film

The invention claimed is:

1. An active matrix substrate, comprising:
pixel electrodes formed in respective areas demarcated by a plurality of gate wiring lines and source wiring lines that intersect each other; and
capacitance wiring lines that are arranged in parallel with the gate wiring lines, the capacitance wiring lines respectively forming capacitances with the pixel electrodes,
wherein the capacitance wiring lines are arranged overlapping outer edges of the pixel electrodes adjacent to each other,
wherein each of the capacitance wiring lines has formed thereon:
a first insulating film that covers the capacitance wiring line;
a height-increasing part in a linear shape formed on the first insulating film and having a narrower line width than the capacitance wiring line, the height-increasing part being formed along the capacitance wiring line; and
a second insulating film covering the height-increasing part, the second insulating film being provided with a protruding band part rising along the height-increasing part, and
wherein the pixel electrodes are formed on the second insulating film such that the outer edges of the pixel electrodes adjacent to each other respectively ride up on the protruding band part.

2. The active matrix substrate according to claim 1, wherein the height-increasing part includes two end parts and a middle part interposed therebetween, and a height of the end parts is set lower than a height of the middle part.

3. The active matrix substrate according to claim 1, wherein the height-increasing part includes two end parts and a middle part interposed therebetween, and a line width of the end parts is set narrower than a line width of the middle part.

4. The active matrix substrate according to claim 1, wherein the height-increasing part is made of a semiconductor film.

5. The active matrix substrate according to claim 1, wherein the height-increasing part includes a lower layer part made of a semiconductor film, and an upper layer part formed thereon and made of the same material as the source wiring lines.

6. The active matrix substrate according to claim 1, wherein end parts of the pixel electrodes have a belt shape that extends along each of the capacitance wiring lines, and have cut-out parts at both ends on an edge of the belt shape.

7. A display panel, comprising the active matrix substrate according to claim 1.

8. A display device, comprising:
an illumination device; and
the display panel according to claim 7 that uses light from the illumination device to perform a display.

9. A television receiving device, comprising the display device according to claim 8.

* * * * *